United States Patent
Ramachandra Iyer

(10) Patent No.: US 11,048,985 B2
(45) Date of Patent: Jun. 29, 2021

(54) METHOD AND SYSTEM FOR CLASSIFYING AN OBJECT IN INPUT DATA USING ARTIFICIAL NEURAL NETWORK MODEL

(71) Applicant: Wipro Limited, Bangalore (IN)

(72) Inventor: Manjunath Ramachandra Iyer, Bangalore (IN)

(73) Assignee: Wipro Limited, Bangalore (IN)

(*) Notice: Subject to any disclaimer, the term of this patent is extended or adjusted under 35 U.S.C. 154(b) by 160 days.

(21) Appl. No.: 16/524,310

(22) Filed: Jul. 29, 2019

(65) Prior Publication Data
US 2020/0394443 A1    Dec. 17, 2020

(30) Foreign Application Priority Data
Jun. 12, 2019  (IN) .............................. 201941023316

(51) Int. Cl.
*G06K 9/62* (2006.01)
*G06N 3/08* (2006.01)
*G06K 9/46* (2006.01)

(52) U.S. Cl.
CPC .............. *G06K 9/628* (2013.01); *G06K 9/46* (2013.01); *G06K 9/6262* (2013.01); *G06N 3/08* (2013.01)

(58) Field of Classification Search
CPC ........ G06K 9/628; G06K 9/6262; G06K 9/46; G06N 3/08; G06N 3/0454; G06N 3/0445
See application file for complete search history.

(56) References Cited

U.S. PATENT DOCUMENTS

| | | | |
|---|---|---|---|
| 7,954,151 B1* | 5/2011 | Nisbet | H04L 63/105 726/22 |
| 9,953,425 B2* | 4/2018 | Lin | G06T 7/33 |
| 2013/0031518 A1* | 1/2013 | Robles | G06F 30/398 716/52 |
| 2015/0254555 A1 | 9/2015 | Williams, Jr. et al. | |
| 2018/0060738 A1 | 3/2018 | Achin et al. | |
| 2021/0035021 A1* | 2/2021 | Sasson | G06F 11/3466 |

\* cited by examiner

*Primary Examiner* — Charles T Shedrick
(74) *Attorney, Agent, or Firm* — Finnegan, Henderson, Farabow, Garrett & Dunner, LLP

(57) ABSTRACT

This disclosure relates to method and system for classifying an object in input data using an artificial neural network (ANN) model. The method may include extracting positive features and orthogonal features associated with the object in the input data, performing a partial classification of the object based on the positive features by a first part of the ANN model, and determining an accuracy of the classification of the object based on the orthogonal features by a second part of the ANN model. The positive features are features uniquely contributing to identification of a class for the object, while the orthogonal features are features not contributing to identification of the class but contributing to identification of one or more of remaining classes.

20 Claims, 6 Drawing Sheets

METHOD AND SYSTEM FOR CLASSIFYING AN OBJECT IN INPUT DATA USING ARTIFICIAL NEURAL NETWORK MODEL

TECHNICAL FIELD

This disclosure relates generally to an artificial neural network (ANN), and more particularly to method and system for classifying an object in input data using an ANN model.

BACKGROUND

A wide variety of artificial intelligence (AI) applications involve classification of content. Typically, an AI system may start making decisions once it is able to identify the components (for example, objects of image, words in text, tones/notes in music, etc.) in the content and their interactions or relations (for example, object 1 chasing object 2, A is the brother of B, note A is more melodious than note B, etc.). An accurate classification and recognition of these components is therefore of importance to the AI applications. Typically, classification may involve an object classification in the image, named entity or verb classification in the text, or the like.

The conventional classification techniques involve detecting presence of certain patterns to arrive to a decision on a class. However, these techniques are limited in their accuracy and efficiency with respect to content classification. For example, accuracies may be impacted due to the limited availability of data to train the AI model or due to limited variations in capturing the training data. Additionally, the conventional techniques are limited in their identification or recognition of object level components in an efficient and a contextual manner. For example, identification/recognition may be impacted by incomplete definition of class. Such incomplete definition focus on what defines a given class and what defines other complimentary class, but not on what does not define a class (i.e. what is not found in the class and certainly found in the complementary class). Further, performing object level classification and recognition may not be enough for content classification.

SUMMARY

In one embodiment, a method for classifying an object in input data using an artificial neural network (ANN) model is disclosed. In one example, the method may include extracting one or more positive features and one or more orthogonal features associated with the object in the input data. The one or more positive features are features uniquely contributing to identification of a class for the object, while the one or more orthogonal features are features not contributing to identification of the class but contributing to identification of one or more of remaining classes. The method may further include performing a partial classification of the object based on the one or more positive features by a first part of the ANN model. The first part of the ANN model detects presence of a pattern in the input data to arrive at the class of the object. The method may further include determining an accuracy of the classification of the object based on the one or more orthogonal features by a second part of the ANN model. The second part of the ANN model detects absence of a pattern in the input data to arrive at the accuracy of the class of the object.

In one embodiment, an object classification device for classifying an object in input data using an ANN model is disclosed. In one example, the object classification device may include at least one processor and a memory communicatively coupled to the at least one processor. The memory may store processor-executable instructions, which, on execution, may cause the processor to extract one or more positive features and one or more orthogonal features associated with the object in the input data. The one or more positive features are features uniquely contributing to identification of a class for the object, while the one or more orthogonal features are features not contributing to identification of the class but contributing to identification of one or more of remaining classes. The processor-executable instructions, on execution, may further cause the processor to perform a partial classification of the object based on the one or more positive features by a first part of the ANN model. The first part of the ANN model detects presence of a pattern in the input data to arrive at the class of the object. The processor-executable instructions, on execution, may further cause the processor to determine an accuracy of the classification of the object based on the one or more orthogonal features by a second part of the ANN model. The second part of the ANN model detects absence of a pattern in the input data to arrive at the accuracy of the class of the object.

In one embodiment, a non-transitory computer-readable medium storing computer-executable instructions for classifying an object in input data using an ANN model is disclosed. In one example, the stored instructions, when executed by a processor, may cause the processor to perform operations including extracting one or more positive features and one or more orthogonal features associated with the object in the input data. The one or more positive features are features uniquely contributing to identification of a class for the object, while the one or more orthogonal features are features not contributing to identification of the class but contributing to identification of one or more of remaining classes. The operations may further include performing a partial classification of the object based on the one or more positive features by a first part of the ANN model. The first part of the ANN model detects presence of a pattern in the input data to arrive at the class of the object. The operations may further include determining an accuracy of the classification of the object based on the one or more orthogonal features by a second part of the ANN model. The second part of the ANN model detects absence of a pattern in the input data to arrive at the accuracy of the class of the object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
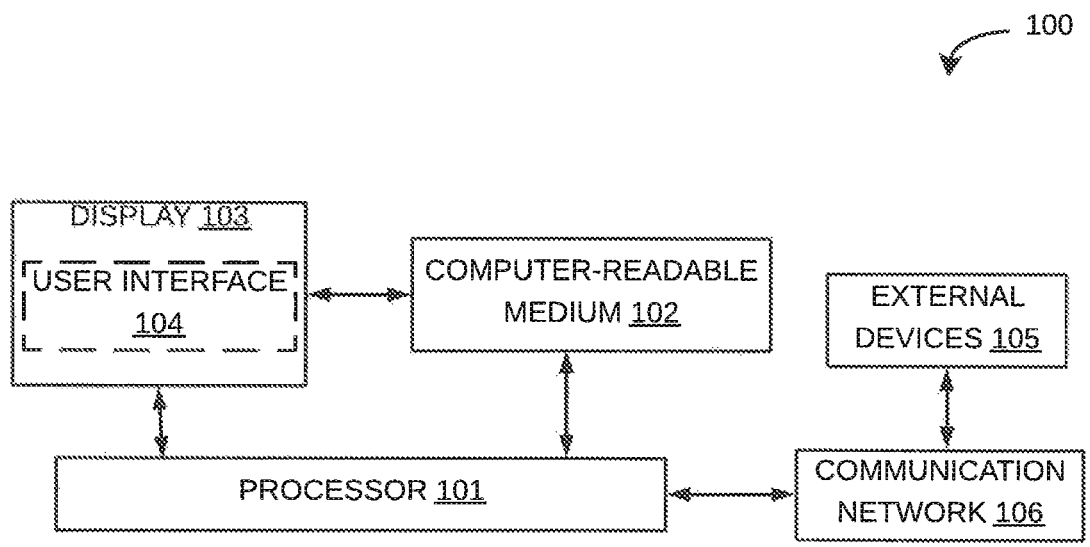
FIG. 1 is a block diagram of an exemplary system for classifying an object in input data using an artificial neural network (ANN) model, in accordance with some embodiments of the present disclosure.

Referring now to FIG. 1, a block diagram of an exemplary system 100 for classifying an object in input data using an artificial neural network (ANN) model is illustrated, in accordance with some embodiments of the present disclosure. The system 100 may implement in an object classification engine, in accordance with some embodiments of the present disclosure. The object classification engine may classify an object in input data using the ANN model. In particular, the system 100 may include an object classification device (for example, server, desktop, laptop, notebook, netbook, tablet, smartphone, mobile phone, or any other computing device) that may implement the object classification engine.

As will be described in greater detail in conjunction with FIGS. 2-8, the object classification engine may extract positive features and orthogonal features associated with the object in the input data. It should be noted that the positive features are features uniquely contributing to identification of a class for the object, while the orthogonal features are features not contributing to identification of the class but contributing to identification of one or more of remaining classes. Further, the object classification engine may perform a partial classification of the object based on the positive features by a first part of the ANN model. The first part of the ANN model detects presence of a pattern in the input data to arrive at the class of the object. Moreover, the object classification engine may determine an accuracy of the classification of the object based on the orthogonal features by a second part of the ANN model. The second part of the ANN model detects absence of a pattern in the input data to arrive at the accuracy of the class of the object.

The system 100 may include one or more processors 101, a computer-readable medium (for example, a memory) 102, and a display 103. The computer-readable storage medium 102 may store instructions that, when executed by the one or more processors 101, cause the one or more processors 101 to classify the object in input data, in accordance with aspects of the present disclosure. The computer-readable storage medium 102 may also store various data (for example, input data, ANN model, one or more positive features, one or more orthogonal features, detected patterns, accuracy of the classification, plurality of features, or the like) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
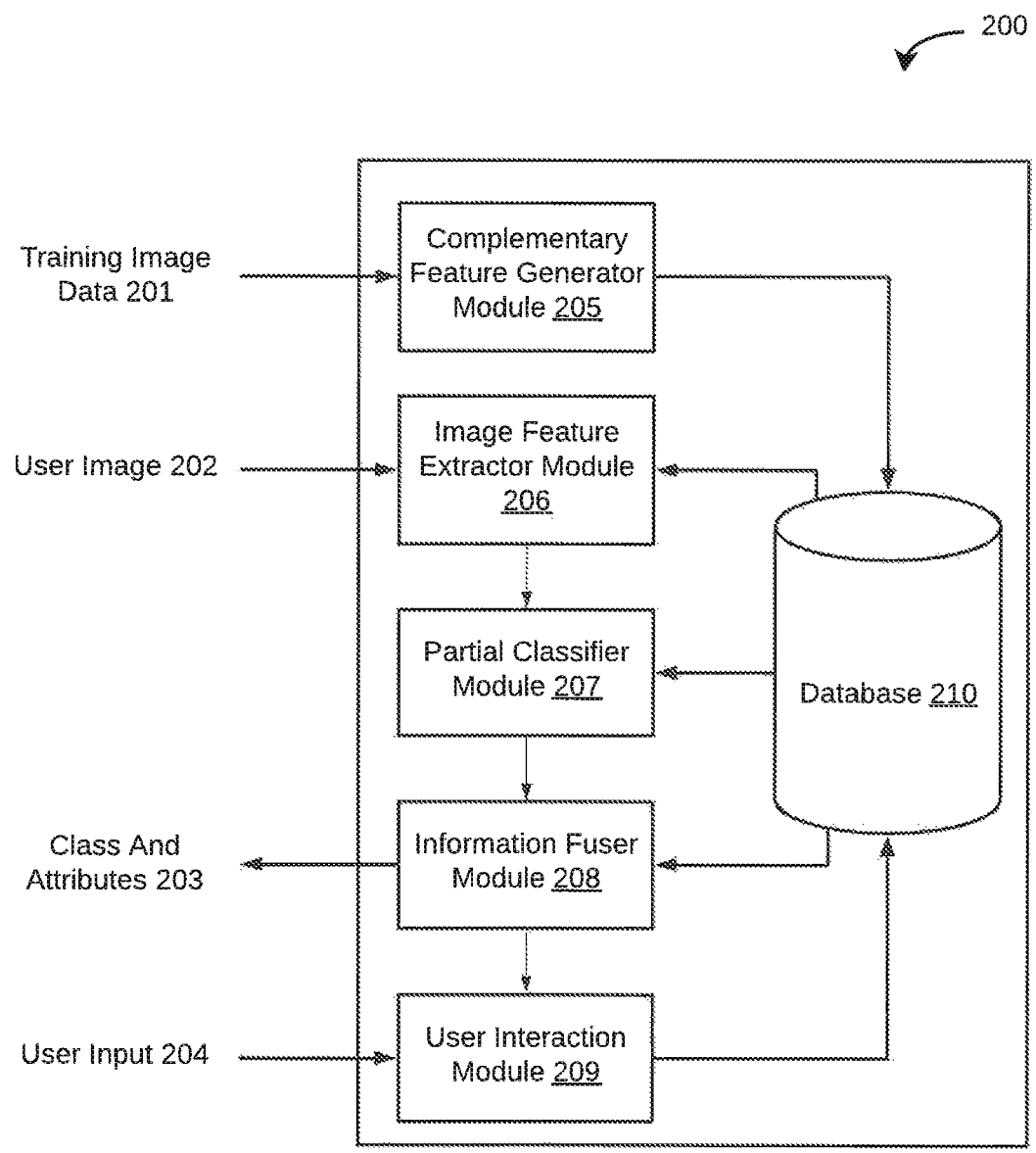
FIG. 2 is a functional block diagram of an object classification device employed by the exemplary system of FIG. 1, in accordance with some embodiments of the present disclosure.

Referring now to FIG. 2, a functional block diagram of an object classification device 200 employed by the exemplary system 100 for classifying an object in input data using an ANN model is illustrated, in accordance with some embodiments of the present disclosure. The object classification device 200 may include a complementary feature generator module 205, an image feature extractor module 206, a partial classifier module 207, an information fuser module 208, a user interaction module 209, and a database 210. As will be appreciated by those skilled in the art, all such aforementioned modules 205-209 may be represented as a single module or a combination of different modules. Moreover, as will be appreciated by those skilled in the art, each of the modules 205-209 and the database 210 may reside, in whole or in parts, on one device or multiple devices in communication with each other.

The complementary feature generator module 205 receive training image data 201 and may generate the class only features (i.e., positive features for a given class), the features shared with other classes, and the complimentary class features (orthogonal features for a given class (i.e., features never found in the given class)) for various classes in the training image data 201. As will be appreciated, the training image data 201 may include a large set of images to learn a plurality of features present in various object classes that may be present in the images. It should be noted that the plurality of features may be applied as an input to subsequent modules 206, 207, and 208. These features will be used to confirm that an image belongs to a particular class and not to other class. Moreover, the system 100 may maintain a feature table including entries of the class only feature, the feature shared with other classes, and the complimentary class features. The feature table may be saved in the database 210.

The image feature extractor module 206 may receive a user image 202 from a user or device for classification and the feature table from the database 210. The image feature extractor module 206 may generate required features for the given user image 202 based on the feature table. Further, the image feature extractor module 206 may send the features of the user image 202 to the partial classifier module 207.

The partial classifier module 207 may implement an ANN classifier to perform classification. In some embodiments, the ANN classifier may be a deep learning classifier such as convolutional neural network (CNN) based classifier. It should be noted that the partial classifier module 207 may identify the class of the user image 202 based on only the class specific feature present in the user image 202. In other words, the features in common with the other classes are either not used or suppressed by the partial classifier module 207. Further, the class of the user image 202 identified by the partial classifier module 207 may be sent to the information fuser module 208.

The information fuser module 208 may use the decision (i.e., classification) by the partial classifier module 207, which may be based on confirmative presence of specific class features in the user image 202. The information fuser module 208 may then use the complementary class features to determine the accuracy of the decision. In particular, the information fuser module 208 may confirm that the features corresponding to other classes may be absent. Thus, validation of the decision by the information fuser module 208 may ensure that the classification is more accurate. Further, the information fuser module 208 may send information on class and attributes 203 of the user image 202 to the user interaction module 209 as well as to the user. The class and attributes 203 may indicate the class of the user image 202 as well as different kinds of features of the user image 202. For example, different kinds of features may include, but may not be limited to, class only features, complementary class features, the features shared with other classes, etc.

The user interaction module 209 may provide an interface to interact with the user. For example, the user interaction module 209 may facilitate the user to change or update the complementary/orthogonal features or attributes of feature table via the interface. Additionally, the user may generate subclasses and increase the number of classes through the interface. Thus, the user may provide a variety of user input 204 to the system 100 to fine tune and learn.

The database 210 may store intermediate results, the plurality of classes and its attributes, the feature table generated by the complementary feature generator module 205, or the like. Moreover, the database 210 may provide table, for computation, to the image feature extractor module 206, to the partial classifier 207, and to the information fuser. In some embodiments, the database 210 may receive user input 204 from the user via the user interaction module 209.

The modules 205-209 and the database 210 in the object classification device 200 may be connected using wireless or wired communication protocols, which may include, but are not limited to Serial Advanced Technology Attachment (SATA), Integrated Drive Electronics (IDE), IEEE-1394, Universal Serial Bus (USB), fiber channel, Small Computer Systems Interface (SCSI), STD Bus, RS-232, RS-422, RS-485, I2C, SPI, Microwire, 1-Wire, IEEE 1284, Intel Quick Path Interconnect, InfiniBand, PCIe etc.

It should be noted that all such aforementioned modules 205-209 may be implemented in programmable hardware devices such as programmable gate arrays, programmable array logic, programmable logic devices, or the like. Alternatively, all such aforementioned modules 205-209 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together but may include disparate instructions stored in different locations which, when joined logically together, comprise the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for classifying an object in input data using an ANN model. For example, the exemplary system 100 and the associated object classification device 200 may classify the object in the input data using the ANN model by the processes discussed herein. In particular, as will be appreciated by those of ordinary skill in the art, control logic and/or automated routines for performing the techniques and steps described herein may be implemented by the system 100 and the associated object classification device 200, either by hardware, software, or combinations of hardware and software. For example, suitable code may be accessed and executed by the one or more processors on the system 100 or the associated object classification device 200 to perform some or all of the techniques described herein. Similarly, application specific integrated circuits (ASICs) configured to perform some or all of the processes described herein may be included in the one or more processors on the system 100 or on the associated object classification device 200.

Figure 3:
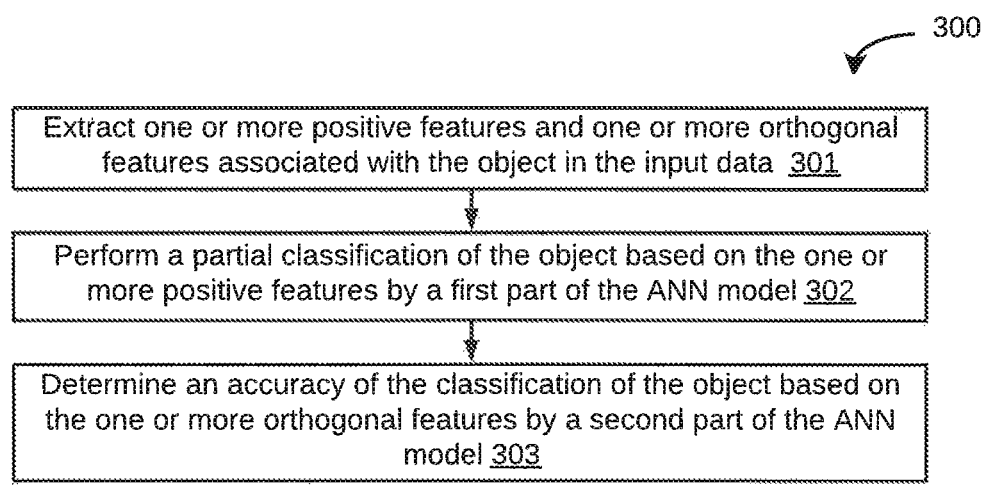
FIG. 3 is a flow diagram of an exemplary process for classifying an object in input data using an ANN model, in accordance with some embodiments of the present disclosure.

For example, referring now to FIG. 3, an exemplary process 300 for classifying an object in input data using an ANN model is illustrated, in accordance with some embodiments of the present disclosure. As illustrated in the flowchart, the process 300 may include the steps of extracting one or more positive features and one or more orthogonal features associated with the object in the input data at step 301, performing a partial classification of the object based on the one or more positive features by a first part of the ANN model at step 302, and determining an accuracy of the classification of the object based on the one or more orthogonal features by a second part of the ANN model at step 303. It should be noted that the one or more positive features may be features uniquely contributing to identification of a class for the object, while the one or more orthogonal features may be features not contributing to identification of the class but contributing to identification of one or more of remaining classes. Further, it should be noted that the first part of the ANN model detects presence of a pattern in the input data to arrive at the class of the object, while the second part of the ANN model detects absence of a pattern in the input data to arrive at the accuracy of the class of the object.

In some embodiments, the process 300 may further include the steps of determining a plurality of positive features and a plurality of orthogonal features for each of a plurality of classes corresponding to a plurality of objects using training data by a multi-stage classifier, and storing the plurality of positive features and the plurality of orthogonal features for each of the plurality of classes in a database. Additionally, in such embodiments, determining the plurality of positive features and the plurality of orthogonal features may include the step of determining, for each of at least two features from among a plurality of features, at least one of a ratio of cross correlation, a ratio of auto correlation, or a Kullback-Leibler (KL) divergence. Further, in such embodiments, extracting the one or more positive features and the one or more orthogonal features associated with the object at step 301 may include the step of employing the plurality of positive features and the plurality of orthogonal features for each of the plurality of classes stored in the database.

In some embodiments, the one or more positive features may further include features common with one or more of remaining classes but contributing to identification of the class for the object. In such embodiments, a lower weightage may be assigned to the features common with one or more of remaining classes. It should be noted that the input data may include one of image data, textual data, audio data, or haptic signal. Additionally, in some embodiments, the first part of the ANN model may include a convolutional neural network (CNN). Further in some embodiments, the second part of the ANN model may include a long short-term memory (LSTM).

In some embodiments, the process 300 may further include the step of receiving user input with respect to at least one of the class, a plurality of classes, the one or more positive features, or the one or more orthogonal features. In such embodiments, the process 300 may further include the step of re-training the ANN model based on the user input.

Figure 4:
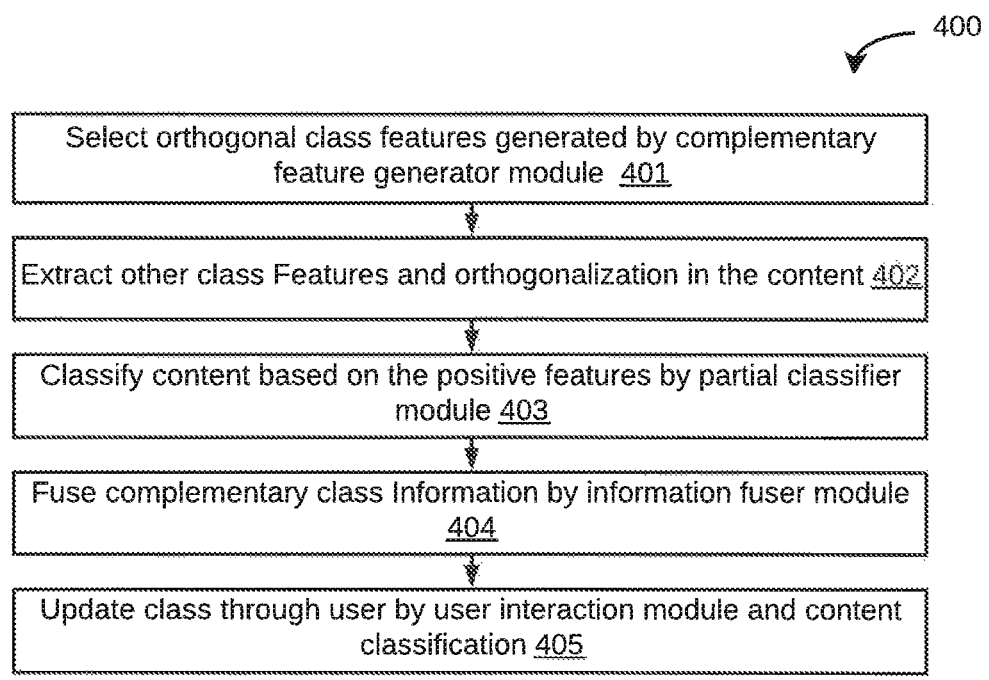
FIG. 4 is a flow diagram of a detailed exemplary process for classifying an object in input data using an ANN model, in accordance with some embodiments of the present disclosure.

Referring now to FIG. 4, a flow diagram of a detailed exemplary process 400 for classifying an object in input data using an ANN model is illustrated, in accordance with some embodiments of the present disclosure. At step 401, the process 400 may select complementary (i.e., orthogonal) class features by the complementary feature generator module 205. In particular, the process 400 may identify the features that are not supposed to be present in a class but found in a different class. It should be noted that the content (e.g., image, audio, text, haptic signal, or the like) may be applied as input to a multi-stage classifier to cater for different use cases. Further, it should be noted that the input may be normalized prior to being fed to the multi-stage classifier. By way of example, the classifier may be a multi-stage image classifier for the purpose of explanation. In some embodiments, the multi-stage image classifier may be a multi-stage CNN classifier.

The complementary feature generator module 205 may construct a feature table for each of the plurality of classes. The feature table may indicate both positive features (i.e., features that are found in the class) and negative features (features that are not found in the class). By way of example, in some embodiments, the complementary feature generator module 205 may construct feature table for each class of the classifier as per Table A below:

TABLE A

|  | Class of interest: classification | All other class: classification |
|---|---|---|
| Class of interest: features | Class specific positive features | Complementary positive features |
| All other classes: features | Class specific negative features | Complementary negative features |

The feature found in a certain class alone may be the class specific features. In some embodiments, these features together with the features found with the complementary classes (i.e., complementary positive features) may contribute for a successful classification. It should be noted that, in some embodiments, complementary negative features do not contribute to the classification and may be discarded. Similarly, other quadrants details may be derived. By way of an example, in the classification of animals as ox or horse, the feature table for horse and Ox classes may be as per Table B below:

TABLE B

|  | Class only features | Features common with other class |
|---|---|---|
| Class of interest: Ox | Horns | Four legs |
| All other class: Horse | Galloping motion | None of these features |

In some embodiments, image versions of these attributes may be stored in database. Additionally, in some embodiments, actions may be also stored as features. For example, in Table B above, the class only feature for the ox class may be horns, while the class only feature for the horse class may be galloping motion. Here, the class only feature for the ox class may be horn because horn may not be a feature for the horse class. Similarly, the class only feature for the horse class may be a galloping motion because galloping motion may not be a feature for the ox class. Moreover, the common feature of each of the classes (i.e., the ox class and the horse class) may be four legs. As will be appreciated, the common feature may not provide a distinguishing contribution to the classification between the ox class and the horse class and may, therefore, be discarded or suppressed for the purpose of classification.

Figure 5:
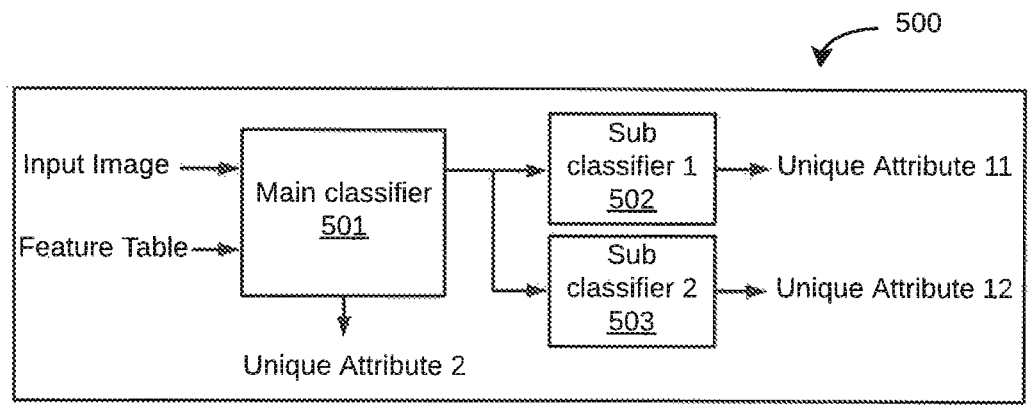
FIG. 5 is a block diagram of a multistage classifier for generating feature table for each class, in accordance with some embodiments of the present disclosure.

Referring now to FIG. 5, a block diagram of a multistage classifier 500 employed by the complementary feature generator module 205 for generating feature table for each class is illustrated, in accordance with some embodiments of the present disclosure. The multistage classifier 500 may include a classifier built to identify each attribute or features. For example, in the illustrated embodiments, a main classifier 501 may be built to receive input image and a feature table and to identify attributes in the feature table. Further, the multistage classifier 500 may implement a sub classifier 502, 503 for each class. It should be noted that the number of sub classifiers 502, 503 may be equal to the number of the attributes. Thus, for each of the plurality of classes and for each of the plurality of sub classes, there may be a unique feature. For example, the unique feature for the main classifier may be unique attribute 2, the unique feature for a sub classifier (1) 502 may be unique attribute 11, and the unique feature for the sub classifier (2) 503 may be unique attribute 12.

Additionally, it should be noted that, the hierarchy of classes may be feasible. In the multistage classifier 500, the first step may be to identify which attributes may be part of a given sub class. Further, an image mapping may be performed for these sub classes such that the images have corresponding attributes. Moreover, the images may be grouped to find the common features. Thus, the images may be mapped with the attributes.

The unique features of each of the plurality of classes may be non-overlapping and far apart. Hence, the features identified for each of the plurality of classes may be compared with the features of the other classes so that the distance between the features of the classes may be high. By way of an example, the distance between colour of ox and colour of horse may vary and can be high when they have different colours in the training images. Moreover, the distance between the colours should be carried out for all available training samples. Hence, colour cannot be a unique feature. However, in a classifier to classify crow and parrot, colour may be unique feature to differentiate because colour of the crow may be generally black and the colour of parrot may be generally green. In one implementation, for comparing the features, the ratio of cross and autocorrelation may be used. Hence, when the commonality between the features is high (i.e., when the ratio is close to 1), then the feature cannot be the unique feature of the class. In other words, the features may contribute for both classes and may, therefore, occupy the top right quadrant in the feature table.

In another embodiment, Kullback-Leibler (KL) divergence may be used to compute the distance between the features when the features may be probabilistically distributed across the training data. It should be noted that more than one feature may found with different probabilities. For example, yak with black colour, and horse with brown and black colour. In one embodiment, a two-class classifier may be built with one class mapping to the class of interest and the other one may be remaining class. By way of an example, for detection of face of a particular individual 'Tom', the classifier may be required to identify 'Tom' from the facial features. Also, in some embodiments, the classifier may be able to determine that it may not be Tom because Tom may not having those features. By way of an example, Tom may have a brown eye, hence a black-eyed face certainly may not be Tom because the eye colour does not change especially in a short time.

Referring back to FIG. 4, at step 402, the process 400 may extract other class features and orthogonalization in the content. In this step, the presence of other class features in a given image may be detected using the feature classifier. Hence, the image to be classified may be passed through the multistage classifier to extract the features. These features may fall under the following categories:
a) Features unique to the class and not found in other class;
b) Features in common with other classes contributing for the class of interest;
c) Features never found in the class of interest but contributing for other classes; and
d) Features never contributing for any class.

It should be noted that the features never contributing for any class may be discarded because it may not contribute in the classification. Thus, for a given image, the features falling in the four quadrants are segregated.

Figure 6:
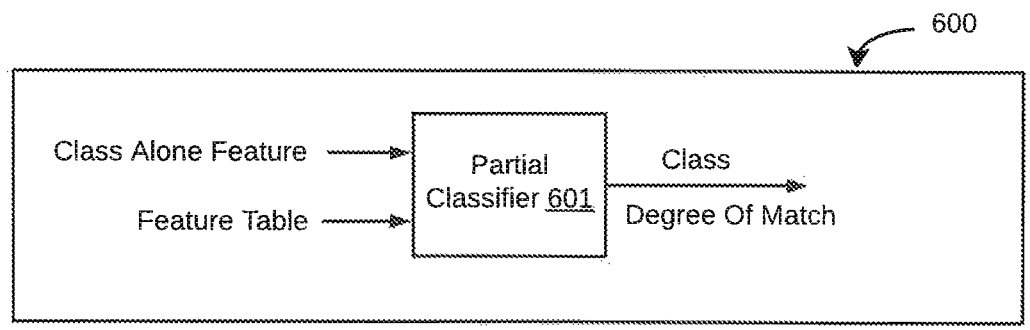
FIG. 6 is a block diagram of a partial classifier for classifying an object in input data, in accordance with some embodiments of the present disclosure.

Further, at step 403, the process 400 may classify content based on the positive features by the partial classifier module 207. In this step, the class of the content object may be identified by the partial classifier module 207. Referring now to FIG. 6, a block diagram of a partial classifier 600 for classifying an object in input data is illustrated, in accordance with some embodiments of the present disclosure. The partial classifier 601 may receive a class alone feature from the feature table as an input and provide the class and degree of match of the input image as the output. The class alone feature may be the features unique to the class and not found in other class and may be fed to the partial classifier 601 to get the best class. It should be noted that the classifier may be partial because unlike conventional classifiers it uses only the class alone feature from the feature table to ensure robust classification. In one implementation, for a given class, there may be more than one class alone feature.

Figure 7:
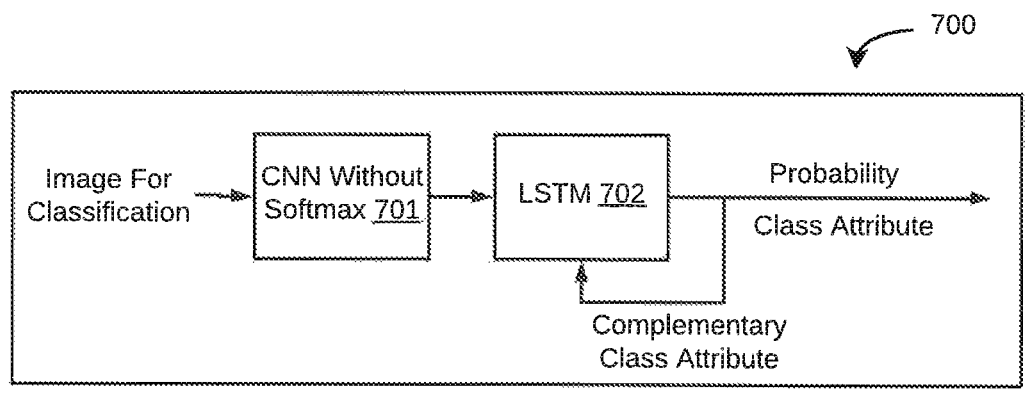
FIG. 7 is an internal architecture of complete classifier for classifying an object in input data, in accordance with some embodiments of the present disclosure.

Referring back to FIG. 4, at step 404, the process 400 may fuse complementary class Information by information fuser module 208. In this step, the complementary information may be used to strengthen the classification. Moreover, the negative pattern fuser absorbs the complementary information in to the system 100 and used after the classifier output. It may include a long short term memory (LSTM) and a dense layer. Referring now to FIG. 7, an internal architecture of a complete classifier 700 for classifying an object in input data is illustrated, in accordance with some embodiments of the present disclosure. A long short term memory (LSTM) 702 may be directly coupled to a CNN without the softmax 701. The input to the LSTM 702 may include the patterns of the attributes. Further, the output of the LSTM 702 may match to one or more attributes found in the image. It should be noted that the attribute selected for a class may have different probabilities. Moreover, the set of attributes may be selected by setting a threshold which may be decided during training phase. Further, the complete classifier 700 may omit the complementary class information or class negative information. When the class negative attributes may also be found, then the accuracy of classification may be small. Hence, the complete classifier 700 may call for retraining with lower or 'zero' weightage to the attributes in the feedback path of the LSTM 702.

Referring back to FIG. 4, at step 405, the process 400 may update class through user by the user interaction module 209 and content classification. In this step, the user may interactively change the attributes associated with the class. The user may fine tuner show how it gets reflected in tables and start affecting subsequent classifications. The step may be realized in the user interaction module 209. Additionally, the user may also create new classes or carve out subclasses to differentiate the images uniquely by adding the unique attributes and training or fine tuning only the LSTM weights.

By way of an example, in an implementation, John visits a marriage hall and gets introduced to many people over there (may be over hundred). Hence, john may find difficult to remember name of all the people and he forget the names of most of them. However, he remember their faces. But, he is unable to refer to them by names throughout the function because he is not sure if a certain face is Peter or Tom.

To avoid repeat of this next time in another party gathering, John takes a small button camera attached to his ear as an ornament and connected with his mobile phone to transfer the video or images. When he gets introduced to Peter as "Hi John, meet this gentleman Peter", he invokes the application from mobile phone (the application in the mobile phone may employ the present invention) binds a single sample of face of peter with his name. The parsed token Peter is associated with the image of peter. After a while, when he forgets the name of Peter, he stands in front of Peter and invokes the application. The name "peter" flashes in his mobile phone making the life of John Simple.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
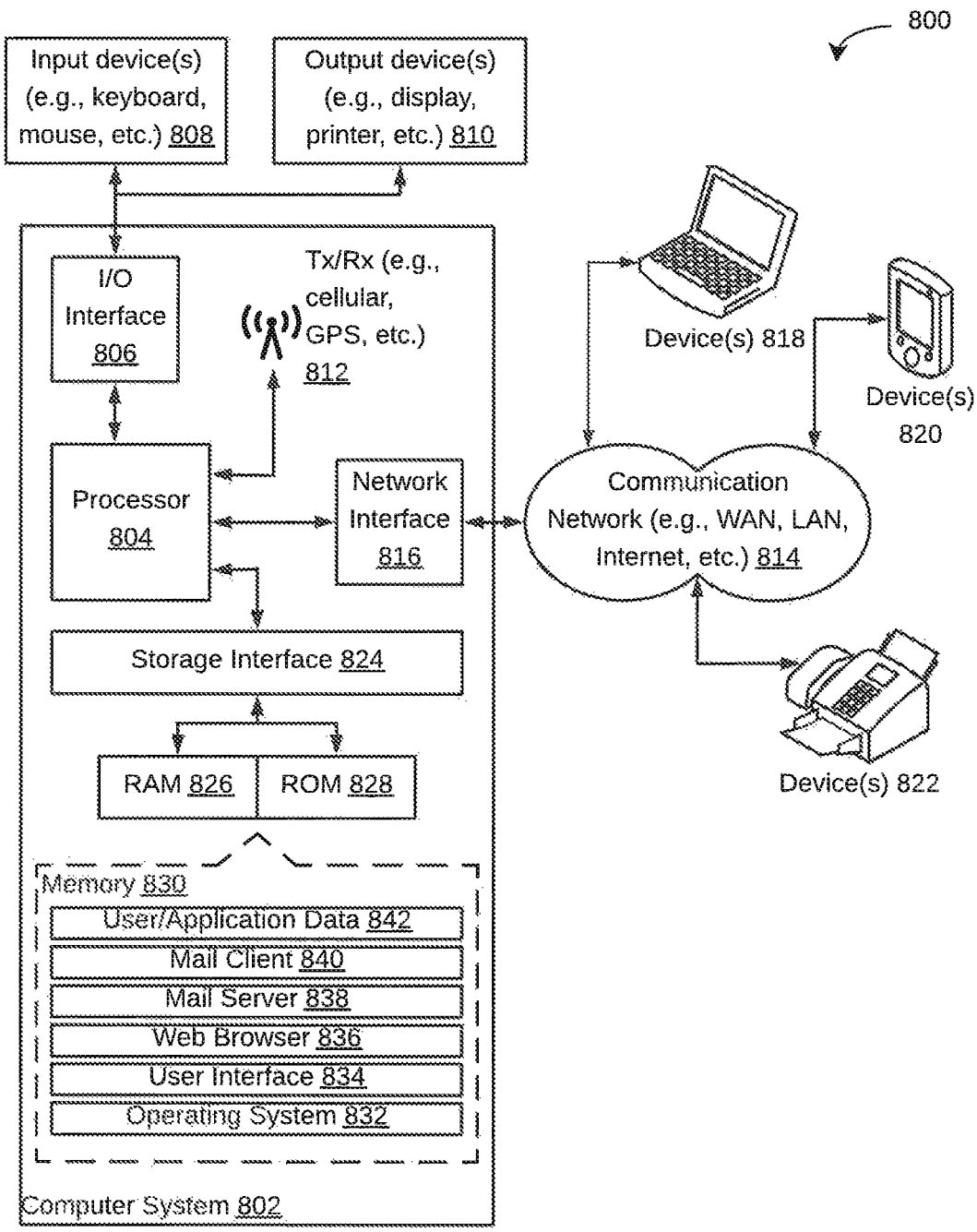
FIG. 8 is a block diagram of an exemplary computer system for implementing embodiments consistent with the present disclosure.

Referring now to FIG. 8, a block diagram of an exemplary computer system 802 for implementing various embodiments is illustrated. Computer system 802 may include a central processing unit ("CPU" or "processor") 804. Processor 804 may include at least one data processor for executing program components for executing user or system-generated requests. A user may include a person, a person using a device such as those included in this disclosure, or such a device itself. Processor 804 may include specialized processing units such as integrated system (bus) controllers, memory management control units, floating point units, graphics processing units, digital signal processing units, etc. Processor 804 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 810 may be a printer, fax machine, video display (for example, cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (for example, using Wireless Application Protocol), the Internet, etc. Using network interface 816 and communication network 814, computer system 802 may communicate with devices 818, 820, and 822. These devices 818, 820, and 822 may include, without limitation, personal computer(s), server(s), fax machines, printers, scanners, various mobile devices such as cellular telephones, smartphones (for example, APPLE® (PHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 802 may itself embody one or more of these devices 818, 820, and 822.

In some embodiments, processor 804 may be disposed in communication with one or more memory devices (for example, RAM 826, ROM 828, etc.) via a storage interface 824. Storage interface 824 may connect to memory 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 830 may store a collection of program or database components, including, without limitation, an operating system 832, user interface application 834, web browser 836, mail server 838, mail client 840, user/application data 842 (for example, any data variables or data records discussed in this disclosure), etc. Operating system 832 may facilitate resource management and operation of computer system 802. Examples of operating systems 832 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 834 may facilitate display, execution, interaction, manipulation, or operation of program components through textual or graphical facilities. For example, user interfaces 834 may provide computer interaction interface elements on a display system operatively connected to computer system 802, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 802 may implement a web browser 836 stored program component. Web browser 836 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 736 may utilize facilities such as AJAX, DHTML, ADOBE® FLASH® platform, JAVASCRIPT® programming language, JAVA® programming language, application programming interfaces (APIs), etc. In some embodiments, computer system 802 may implement a mail server 838 stored program component. Mail server 838 may be an Internet mail server such as MICROSOFT® EXCHANGE® mail server, or the like. Mail server 838 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 838 may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement a mail client 840 stored program component. Mail client 840 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 802 may store user/application data 842, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provides method and system for classifying an object in input data using an ANN model. The method may ensure that dominant features of the other class may not be present in a class. Moreover, in the proposed method, classification decision may be made based on both positively (should be present) and negatively (should be absent) contributing features. Therefore, less training data may be sufficient for classification. Additionally, the proposed method may provide an approach to the user to start adding new unique features of a class at any point. Hence the method may be extensible. Moreover, in the proposed method, the user may create new sub classes to differentiate from main class by adding unique features of subclass or add new main classes along with their patterns. Hence, the method may be scalable.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem. For example, claimed invention provides for accurate classification not only based on positive class information (e.g., features to be expected in a class) but also on complementary class information (e.g., features not to be expected in a class). In other words, claimed invention not only detects presence of certain patterns to identify the class of an object, but also detects absence of certain patterns to ensure that they do not belong to other classes.

The specification has described system and method of classifying an object in input data using an ANN model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of classifying an object in input data using an artificial neural network (ANN) model, the method comprising:

extracting, by an object classification device, one or more positive features and one or more orthogonal features associated with the object in the input data, wherein the one or more positive features are features uniquely contributing to identification of a class for the object, and wherein the one or more orthogonal features are features not contributing to identification of the class but contributing to identification of one or more of remaining classes;

performing, by the object classification device, a partial classification of the object based on the one or more positive features by a first part of the ANN model, wherein the first part of the ANN model detects presence of a pattern in the input data to arrive at the class of the object; and determining, by the object classification device, an accuracy of the classification of the object based on the one or more orthogonal features by a second part of the ANN model, wherein the second part of the ANN model detects absence of a pattern in the input data to arrive at the accuracy of the class of the object.

2. The method of claim 1, further comprising:

determining a plurality of positive features and a plurality of orthogonal features for each of a plurality of classes corresponding to a plurality of objects using training data by a multi-stage classifier; and storing the plurality of positive features and the plurality of orthogonal features for each of the plurality of classes in a database.

3. The method of claim 2, wherein determining the plurality of positive features and the plurality of orthogonal features comprise determining, for each of at least two features from among a plurality of features, at least one of a ratio of cross correlation, a ratio of auto correlation, or a Kullback-Leibler (KL) divergence.

4. The method of claim 2, wherein extracting the one or more positive features and the one or more orthogonal features associated with the object comprises employing the plurality of positive features and the plurality of orthogonal features for each of the plurality of classes stored in the database.

5. The method of claim 1, wherein the one or more positive features further comprises features common with one or more of remaining classes but contributing to identification of the class for the object, and wherein a lower weightage is assigned to the features common with one or more of remaining classes.

6. The method of claim 1, wherein the input data comprises one of image data, textual data, audio data, or haptic signal.

7. The method of claim 1, wherein the first part of the ANN model comprises a convolutional neural network (CNN) and the second part of the ANN model comprises a long short-term memory (LSTM).

8. The method of claim 1, further comprising:

receiving user input with respect to at least one of the class, a plurality of classes, the one or more positive features, or the one or more orthogonal features; and re-training the ANN model based on the user input.

9. An object classification device for classifying an object in input data using an artificial neural network (ANN) model, the object classification device comprising:

at least one processor and a computer-readable medium storing instructions that, when executed by the at least one processor, cause the at least one processor to perform operations comprising:

extracting one or more positive features and one or more orthogonal features associated with the object in the input data, wherein the one or more positive features are features uniquely contributing to identification of a class for the object, and wherein the one or more orthogonal features are features not contributing to identification of the class but contributing to identification of one or more of remaining classes;

performing a partial classification of the object based on the one or more positive features by a first part of the ANN model, wherein the first part of the ANN model detects presence of a pattern in the input data to arrive at the class of the object; and determining an accuracy of the classification of the object based on the one or more orthogonal features by a second part of the ANN model, wherein the second part of the ANN model detects absence of a pattern in the input data to arrive at the accuracy of the class of the object.

10. The object classification device of claim 9, wherein the operations further comprise:

determining a plurality of positive features and a plurality of orthogonal features for each of a plurality of classes corresponding to a plurality of objects using training data by a multi-stage classifier; and storing the plurality of positive features and the plurality of orthogonal features for each of the plurality of classes in a database.

11. The object classification device of claim 10, wherein determining the plurality of positive features and the plurality of orthogonal features comprise determining, for each of at least two features from among a plurality of features, at least one of a ratio of cross correlation, a ratio of auto correlation, or a Kuliback-Leibler (KL) divergence.

12. The object classification device of claim 10, wherein extracting the one or more positive features and the one or more orthogonal features associated with the object comprises employing the plurality of positive features and the plurality of orthogonal features for each of the plurality of classes stored in the database.

13. The object classification device of claim 9, wherein the one or more positive features further comprises features common with one or more of remaining classes but contributing to identification of the class for the object, and wherein a lower weightage is assigned to the features common with one or more of remaining classes.

14. The object classification device of claim 9, wherein the input data comprises one of image data, textual data, audio data, or haptic signal.

15. The object classification device of claim 9, wherein the first part of the ANN model comprises a convolutional neural network (CNN) and the second part of the ANN model comprises a long short-term memory (LSTM).

16. The object classification device of claim 9, wherein the operations further comprise:

receiving user input with respect to at least one of the class, a plurality of classes, the one or more positive features, or the one or more orthogonal features; and re-training the ANN model based on the user input.

17. A non-transitory computer-readable medium storing computer-executable instructions for classifying an object in input data using an artificial neural network (ANN) model, the non-transitory computer-readable medium configured for:

extracting one or more positive features and one or more orthogonal features associated with the object in the input data, wherein the one or more positive features are features uniquely contributing to identification of a class for the object, and wherein the one or more orthogonal features are features not contributing to identification of the class but contributing to identification of one or more of remaining classes;

performing a partial classification of the object based on the one or more positive features by a first part of the ANN model, wherein the first part of the ANN model detects presence of a pattern in the input data to arrive at the class of the object; and determining an accuracy of the classification of the object based on the one or more orthogonal features by a second part of the ANN model, wherein the second part of the ANN model detects absence of a pattern in the input data to arrive at the accuracy of the class of the object.

18. The non-transitory computer-readable medium of claim 17, further configured for:
   determining a plurality of positive features and a plurality of orthogonal features for each of a plurality of classes corresponding to a plurality of objects using training data by a multi-stage classifier; and
   storing the plurality of positive features and the plurality of orthogonal features for each of the plurality of classes in a database.

19. The non-transitory computer-readable medium of claim 17, wherein the one or more positive features further comprises features common with one or more of remaining classes but contributing to identification of the class for the object, and wherein a lower weightage is assigned to the features common with one or more of remaining classes.

20. The non-transitory computer-readable medium of claim 17, further configured for:
   receiving user input with respect to at least one of the class, a plurality of classes, the one or more positive features, or the one or more orthogonal features; and
   re-training the ANN model based on the user input.

* * * * *